Jan. 25, 1949.  R. E. RISLEY  2,460,032
COUPLING FOR BEADED PIPES OR TUBINGS
Filed July 4, 1945  2 Sheets-Sheet 1
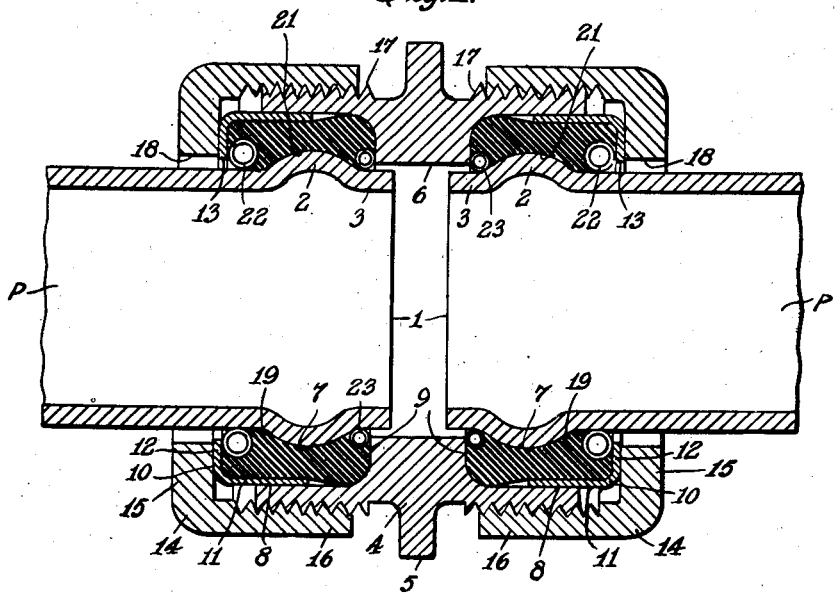
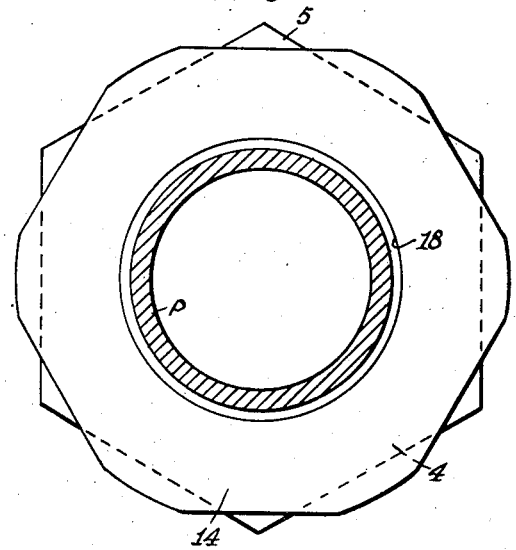
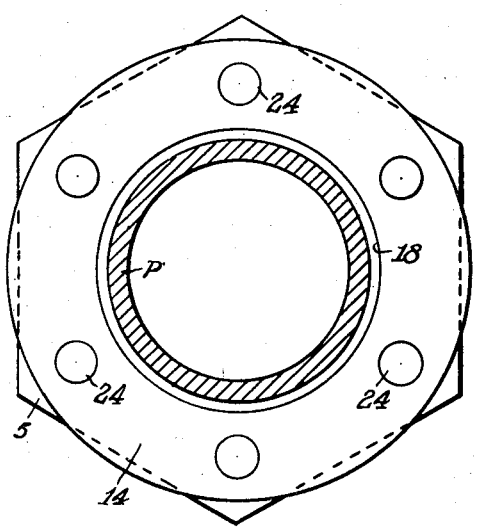
INVENTOR.
ROGER E. RISLEY
BY
Robert E. Burns
ATTORNEY.

Jan. 25, 1949.  R. E. RISLEY  2,460,032
COUPLING FOR BEADED PIPES OR TUBINGS
Filed July 4, 1945  2 Sheets-Sheet 2
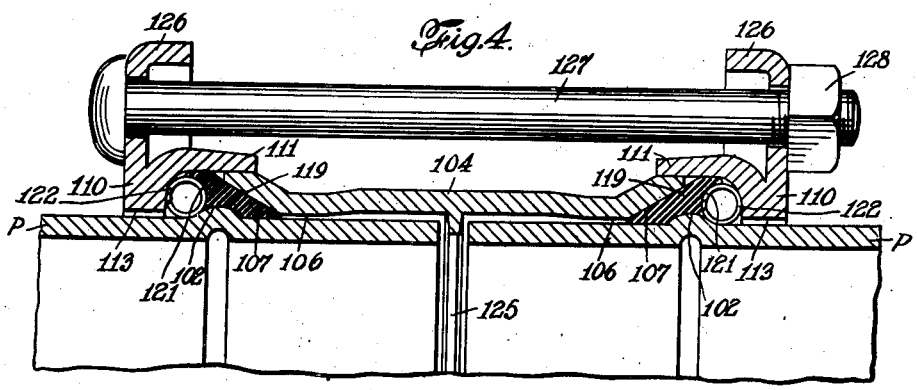
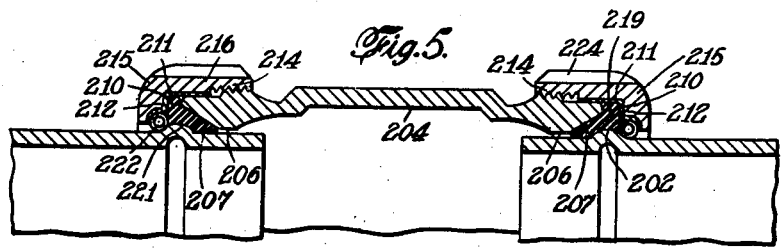
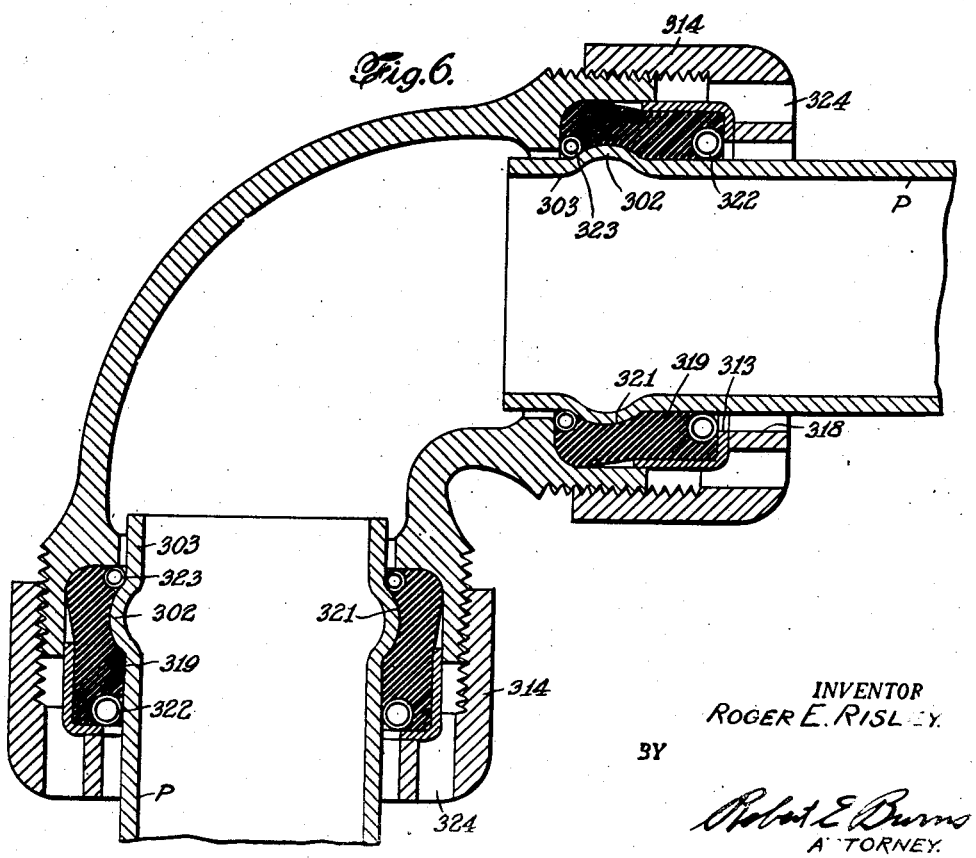
INVENTOR
ROGER E. RISLEY Patented Jan. 25, 1949

2,460,032

UNITED STATES PATENT OFFICE 2,460,032

COUPLING FOR BEADED PIPES OR TUBINGS

Roger E. Risley, Bradford, Pa., assignor to Dresser Industries, Inc., Cleveland, Ohio, a corporation of Pennsylvania Application July 4, 1945, Serial No. 603,169

8 Claims. (Cl. 285—90)

The present invention relates to fittings for pipe, tubing, etc. herein referred to generically as "pipe," having an external circumferential bead which is located near, but preferably spaced slightly from, the end face of the pipe. The term pipe fitting is herein used to include couplings, ells, tees, crosses, adaptors, valves, and other fittings adapted to be connected with one or more sections of pipe.

In the piping used in the fuel, lubricating, coolant and hydraulic systems of aircraft, the couplings and other fittings used in the system are subject to exacting and difficult requirements. A certain amount of flexibility is desirable to permit flexing of the pipe and to avoid excessive strains. On the other hand, the fittings must provide absolutely fluid tight joints even under high pressure and must lock the joint against separation by longitudinal thrust, vibration, or other causes. Furthermore, it is hightly desirable for the fittings to be of such nature that they can be quickly installed even when it is necessary to work in close quarters and can be readily disconnected and reconnected.

In installations of this kind it has heretofore been proposed to use a special type of hose joint consisting of a short piece of rubber hose connecting the ends of the pipe and held at each end by a hose clamp. The tube is generally beaded and the clamps are located behind the beads to provide greater resistance to separation of the joints by longitudinal thrust. Couplings of this kind are rather difficult to install. If the hose sections are sufficiently thick-walled and strong to withstand the fluid pressure of the line and are of a diameter to fit the pipe snugly, it is difficult to slip them over the ends of the pipe and over the beads. Moreover, the rubber tube connecting the ends of the pipe is subjected to full line pressure and also to considerable vibration and other mechanical stresses and is liable to be a weak spot in the system.

It has also been proposed to unite beaded pipe by means of gasket type couplings. However, with such couplings it has been necessary to place one or more of the coupling elements on the pipe before the latter is beaded. The beading of the pipe after the coupling has been applied requires special tools and is a time-consuming and expensive operation. Such a method of joining pipe is wholly impractical and unsatisfactory for installing piping in close quarters as in aircraft construction and maintenance. Moreover, with some types of pipe, for example hardened steel or glass pipe, a bead can be provided readily during manufacture but cannot, without considerable difficulty, be formed on the pipe thereafter.

It is an object of the present invention to solve the problems and overcome the difficulties indicated above and to provide improved gasket type fittings for beaded pipe and tubing. Another object of my invention is to provide a pipe fitting having maximum flexibility while at the same time assuring fluid tightness even at high pressures and great holding strength to prevent separation of the pipe and fitting by longitudinal thrust.

A further object of my invention is to provide a gasket type coupling which can be applied to pipe that has been previously beaded. An advantage of such a coupling is that the bead can be formed during manufacture of the pipe, making unnecessary any beading operation during the assembly of the pipe and fitting. Moreover, such a coupling can be used with hardened steel, glass or other pipe that can be provided with a bead during manufacture but cannot be readily beaded in the field.

The problem of providing a gasket type coupling or other fitting that can be applied to previously beaded pipe gives rise to the difficulty that if the gasket follower or other member for applying pressure to the gasket is made large enough to pass over the bead of the pipe, there is so much space between the follower and the portion of the pipe beyond the bead that the gasket material will be extruded when pressure is applied. In accordance with the present invention, this problem is solved by providing at the outer end of the gasket an expansible ring which is sufficiently expansive to pass over the bead during the assembly of the pipe and fitting and yet fits the pipe closely when in position back of the bead. This expansible ring, which is preferably combined with the gasket in a unitary structure, prevents extrusion of the gasket material through the space between the follower ring and the wall of the pipe. Moreover, when the coupling is installed, the expansible ring is locked against expansion so that withdrawal of the bead of the pipe through it is effectively prevented. The expansible ring thus serves the dual function of preventing extrusion of the gasket material and preventing separation of the pipe and fitting by longitudinal thrust and virbration.

Other features, characteristics and advantages of my invention will be apparent from the following description and claims in conjunction with the accompanying drawings which show by way of example a number of pipe fittings in which my invention is embodied.

In the drawings,

Fig. 1 is a central longitudinal sectional view of a pipe joint formed with a coupling in accordance with my invention.

Fig. 2 is an end elevation of the coupling shown in Fig. 1, the pipe being shown in transverse section.

Fig. 3 is a view similar to Fig. 2 but shows a modification.

Fig. 4 is a partial longitudinal section of a pipe joint with another form of coupling in accordance with my invention.

Fig. 5 is a view similar to Fig. 4, showing a further modification.

Fig. 6 is a view similar to Fig. 1 but shows the application of my invention to an ell.

In Figs. 1 and 2 of the drawings, there is shown a pipe joint in which two sections of pipe P are connected by a pipe coupling embodying my invention. Each length of pipe is provided adjacent its end 1 with an external circumferential bead 2 of substantially greater external diameter than the main portion of the pipe. The bead 2 is preferably spaced back from the end of the pipe, as shown in Fig. 1, leaving a terminal portion 3 which is of lesser diameter than the bead and preferably about the same diameter as the body of the pipe. While the cross sectional shape of the bead 2 may be varied as desired, it is preferable from the point of view of manufacture, installation and service to provide a bead of arcuate or rounded cross section as shown. Since the fitting in accordance with my invention is readily installed on previously beaded pipe, the bead may be formed by rolling, welding, casting, molding, machining, or otherwise during manufacture of the pipe or at any other convenient time.

The coupling shown in Figs. 1 and 2 comprises a body portion 4 having a central wrench section 5 for holding the fitting against turning during installation. The body portion 4 is hollow or annular, providing a central aperture 6 to receive the ends of the pipe sections. The inside diameter of the pipe aperture 6 is slightly greater than the outside diameter of the terminal portion 3 of the pipe but less than the outside diameter of the bead 2. On each side of the pipe aperture 6 the coupling is provided with an annular gasket recess 7. The shape of the gasket recess may be varied in accordance with the service for which the coupling is intended and the shape of the gasket employed. In the particular embodiment shown in Fig. 1, the gasket recess is of approximately cylindrical shape being formed by a substantially cylindrical wall surface 8 and a substantially radial wall surface or shoulder 9, the junction of the two surfaces being filleted or rounded.

A gasket follower 10 cooperates with the body portion of the coupling to enclose and apply sealing pressure to the gasket. The gasket follower is shown in Fig. 1 as an annular cup-shaped member having a cylindrical portion 11 which embraces the gasket and is a sliding fit inside the gasket recess 7 and a substantially radial end portion 12. The end wall of the gasket follower is apertured to receive the pipe, the aperture 13 being of greater diameter than the maximum outside diameter of the pipe bead 2 so that the follower can be placed on the pipe by slipping it over the bead. The gasket follower 10 is of such shape that it can readily be formed from sheet metal by a stamping and punching operation.

The fitting is also provided with means for producing relative axial movement of the body portion 4 and the follower 10 to apply sealing pressure to the gasket. This means is shown in Fig. 1 as an annular follower nut 14 having an apertured end wall 15 adapted to engage the end face 12 of the gasket follower and a cylindrical portion 16 provided on its inner face with screw threads adapted to engage corresponding external threads 17 provided on the annular end portions of the body. The aperture 18 of the follower nut 14 is of greater diameter than the pipe bead 2 so that the follower nut can be slipped over the bead and is preferably of approximately the same size as the aperture 13 of the follower 10. The exterior of the follower nut is shaped to provide a wrench section for rotating the nut relative to the body portion 4 to screw it on or off the body. The gasket follower 10 does not rotate and the gasket is hence not subjected to appreciable torsional or shearing stresses but only to compression when the follower nut is tightened.

An annular gasket 19 is provided in the gasket space or recess defined by the recess 7 of the body portion, the follower 10 and the pipe. The shape of the gasket preferably corresponds approximately to the shape of this recess and is shown as being substantially cylindrical. In the inner or pipe-engaging surface of the gasket there is provided an annular groove or recess 21 which is adapted to receive the bead 2 of the pipe and is preferably of approximately the same cross sectional shape as the bead. The annular groove 21 is shown as being located nearer the inner than the outer end of the gasket for a reason that will be explained below.

The gasket 19 is formed of rubber composition, this term being used generically to include natural or synthetic rubber components, or compositions having like properties and characteristics. The material is substantially firm and solid but sufficiently resilient and elastic to flow under pressure to conform to the confining wall surfaces.

As the inner diameter of the gasket follower 10 is sufficiently large for the follower to pass over the bead, the space or gap between the pipe and the gasket follower when the latter is in position on the pipe back of the bead, as shown in Fig. 1, is so great that the gasket material would normally be extruded through this space when pressure is applied. In accordance with the present invention such extrusion is prevented by providing at the outer end of the gasket an expansible metallic ring 22 which normally fits closely the outer diameter of the pipe but is sufficiently expansible that it will pass over the bead 2 when unconfined. The expansible ring 22 is preferably combined with the gasket 19 in a single unitary structure and is shown in the form of an annular armor helix which is molded into the rubber composition of the gasket. The endless helix 22 may be wound of wire or otherwise formed and has successive turns substantially in contact with one another. It is embedded in the gasket so as to be substantially flush with the inner or pipe-engaging face of the gasket and also with the outer end face.

While the inner diameter of the follower is greater than the outer diameter of the pipe bead 2 and hence substantially greater than the outer diameter of the portion of the pipe back of the bead, it is smaller than the outer diameter of the expansible ring 22. Thus the expansible ring closes the gap between the gasket follower and the pipe and prevents extrusion of the rubber material of the gasket when the follower nut 14 is drawn up to apply sealing pressure to the gasket.

Moreover, the expansible ring 22 serves the further function of locking the pipe against separation from the fitting. When unconfined, the gasket and the toroidal armor helix 22 are expansible so as to be slipped readily over the bead of the pipe. However, when the gasket and armor ring are confined between the body portion of the fitting and the gasket follower, and particularly when the follower is drawn up tight, the ring 22 is held against expansion and maintained in the contracted position shown in Fig. 1. With the ring thus contracted to a smaller diameter than the pipe bead 2, separation of the pipe from the fitting is prevented.

The annular groove 21 which is formed in the inner face of the gasket and fits over the pipe bead 2 is preferably located near the inner end of the gasket and is thus spaced a substantial distance from the expansible ring 22. With this arrangement the application of pressure to the gasket by drawing up the follower 10 causes no appreciable longitudinal movement of the pipe relative to the body portion of the fitting.

The inner end of the gasket 19 is provided with an annular armor helix 23 which is similar to the armor helix 22 at the outer end of the gasket but may be of smaller cross section. The ring 23 prevents extrusion of the gasket material through any space that there may be between the pipe and the pipe aperture 6 and protects the rubber material of the gasket from gasoline, oil or other fluid carried by the pipe. It also acts in the same manner as the ring 22 to hold the pipe against longitudinal movement relative to the fitting. When the gasket and the associated rings 22 and 23 are confined by the body portion of the fitting and the follower 10, the bead of the pipe is locked between the two rings 22 and 23 thereby limiting relative movement of the pipe and fitting and preventing their separation.

Although the fitting in accordance with my invention effectively prevents the pipe from being withdrawn from the coupling by longitudinal thrust resulting for example from line pressure, it will be seen from Fig. 1 that when the coupling is installed the pipe engages only the gasket 19 and associated expandable rings 22 and 23 and does not engage the body portion of the fitting, the gasket follower 10 or the follower nut 14. The resilience of the gasket material permits limited longitudinal movement of the pipe relative to the fitting and also considerable lateral or angular deflection. Moreover, the bead of the pipe and the groove 21 of the gasket form, in effect, a ball and socket connection between the pipe and fitting. The large inside diameter of the follower and the follower nut and the resulting clearance between these members and the wall of the pipe also contributes to the flexibility and permissible angular deflection of the pipe joint. At the same time, the elasticity of the gasket material tends to restore the pipe to alignment. The coupling in accordance with my invention thus combines unusual flexibility with great strength and permanent fluid tightness. Moreover, it will be noted that unlike the hose type couplings referred to above, the rubber portion of the coupling in accordance with my invention is protected both from attack by line materials such as oil or gasoline and from either chemical or mechanical damage from the exterior. The enclosure of the rubber portion of the coupling or fitting also inhibits the natural aging that results from access to light and air.

To install the coupling on the pipe, the nut 14 and the follower 10 are slipped over the bead 2 and the gasket is positioned as shown in Fig. 1 with the annular groove in the inner face of the gasket engaging the pipe bead. The expansible ring 22 stretches sufficiently to pass over the bead 2 when the gasket is slipped into position on the pipe. The body portion 4 of the coupling is then slipped over the end of the pipe and the nut 14 is screwed onto the threaded portion of the body and tightened to apply pressure to the gasket and effect a tight seal. The ring 22 is of sufficient size to engage the follower 10 which is in turn engaged by the nut 14 thus effectively preventing the tubing from being withdrawn from the coupling by longitudinal thrust. The coupling can readily be disconnected from the pipe by a reversal of the steps described above. The line can thus be easily opened up for inspection or repairs and any pipe section or any portion of the fitting that may have been damaged can be easily and quickly replaced.

It will be understod that pipe fittings can be made in a wide variety of forms and sizes within the scope of my invention. A few of the many possible variations are illustrated by way of example in Figs. 3 to 6 of the drawings. The fitting shown in Fig. 3 is very similar to that of Figs. 1 and 2 and has like parts designated by the same reference numbers. It differs from the embodiment previously described in that the follower nut 14, instead of being shaped to form an external wrench section, is cylindrical and the end face of the nut is provided with a plurality of holes 24 so that the nut can be turned by means of a spanner wrench. This construction makes it possible for the coupling to be of even smaller overall size and is desirable where space is at a premium.

In Fig. 4 there is shown a partial longitudinal section of a pipe joint employing another form of coupling in accordance with my invention. The parts of this coupling are designated by the same reference numerals as corresponding parts of Figs. 1 and 2 with the addition of 100. The coupling shown in Fig. 4 is in general suitable for larger diameter pipe and comprises a middle ring or sleeve 104 of approximately cylindrical shape. The middle ring 104 has pipe receiving apertures 106 separated by a central stop or positioning flange 125. Each end of the middle ring is flared outwardly to provide a gasket recess 107. A follower ring 110 provided at each end of the middle ring has an inner flange portion 111 which fits over the end portion of the middle ring and an outer flange portion 126. The pipe aperture 113 of the follower ring is of sufficiently large diameter to pass over the pipe bead 102. A plurality of track headed bolts 127 extend between the two follower rings and are provided with nuts 128 for drawing the follower rings toward one another and hence toward the middle ring 104 to apply sealing pressure to a gasket 119 disposed in the gasket space or recess defined by the middle ring 104, the follower ring 110 and the wall of the pipe.

The gasket 119 is approximately wedge-shaped in cross section and has on its inner or pipe-engaging surface an annular groove or recess 121 adapted to fit over the bead 102 of the pipe. At the outer end of the gasket there is provided an expansible metallic ring 122 which is preferably an annular armor helix similar to the ring 22 of Fig. 1 and is formed with the gasket as a unitary structure. The ring 122 is sufficiently expansible as to pass over the pipe bead 102 when the gasket is slipped into position on the pipe. When the nuts 128 on bolts 127 are tightened to draw up the follower rings 110, the expansible rings 122 prevent extrusion of the gasket material through the space between the wall of the pipe and the enlarged apertures 113 of the follower rings and also hold the pipe against being withdrawn from the coupling.

In Fig. 5 there is shown a further form of coupling in accordance with my invention, corresponding parts being designated by the same reference numerals as in Figs. 1 and 2 with the addition of 200. This embodiment of my invention is similar to that shown in Fig. 4 and comprises a middle ring 204 having at each end a pipe aperture 206 and a gasket recess 207. An annular cup-shaped gasket follower 210 has a substantially cylindrical wall portion 211 embracing the gasket and slidably engaging the end portion of the middle ring and an inwardly extending wall portion 212 engaging the outer end face of the gasket. An annular follower nut 214 is also approximately cup-shaped and has a radial portion 215 engaging the inwardly extending portion 212 of the gasket follower and an approximately cylindrical portion 216 provided on its inner surface with screw threads adapted to engage corresponding external threads provided on the middle ring so that sealing pressure can be applied to the gasket by relative rotation of the follower nuts 214 and the middle ring 204. A series of grooves 224 is provided in the periphery of the follower nut 214 to facilitate turning the nut by a suitable wrench. The follower ring 210 does not rotate.

In the gasket recess at each end of the middle ring there is provided a wedge-shaped gasket 219 having an annular groove 221 that fits over the bead 202 provided on the pipe. An expansible ring 222 in the form of an annular armor helix similar to the ring 122 of Fig. 4 is provided at the outer end of the gasket and prevents extrusion of the gasket through the space that results from the aperture in the gasket follower being made large enough to pass over the pipe bead 202. As in the embodiments previously described, the ring 222 also serves to prevent separation of the pipe and fitting by longitudinal thrust.

In Figs. 4 and 5 the expansible ring 122, 222 provided at the outer end of the gasket projects beyond the main portion of the gasket material in a direction axial of the pipe and is held against expansion by the follower ring thereby locking the expansible ring 122, 222 in contracted position and preventing withdrawal of the pipe from the fitting without, however, destroying the flexibility of the pipe joint. The follower ring of Fig. 5 has a special arcuate recess portion that fits over and engages the expansible ring 222 and prevents radial expansion of the ring when the coupling is assembled.

In Fig. 6 there is shown a further embodiment of my invention in which corresponding parts are designated by the same reference numerals as in Fig. 1 with the addition of 300. The pipe fitting shown in Fig. 6 is substantially the same as that of Fig. 1 except that it is in the form of an ell rather than a straight coupling. The follower nut 314 is provided with a series of holes 324 for a spanner wrench as in Fig. 3. It will be apparent that my invention is likewise applicable to other pipe fittings such as tees, crosses, adaptors, valves, caps, etc.

Except as otherwise shown or described, the construction and operation of the fittings shown in Figs. 3 to 6 will be understood to be the same as described in conjunction with Figs. 1 and 2 so that detailed description of each form is unnecessary. Moreover, it will be understood that various features and modifications shown in the several figures are interchangeable. For example in the forms shown in Figs. 4 and 5 the gasket may be provided with annular armor helices at both ends. Alternatively, the gasket, instead of being wedge-shaped or triangular in cross section, may be approximately rectangular as in Figs. 1 and 6 or of other cross section as desired.

While for convenience of manufacture, distribution and installation it is preferable for the expansible ring at the outer end of the gasket to be unitary with the gasket, it will be understood that it may be supplied as a separate member if desired. Moreover, instead of being in the form of an annular or toroidal armor helix as shown, the expansible ring may be otherwise formed, for example as a split or sectional ring, so that it can be positioned behind the previously formed bead of the pipe and yet be contracted and fit the pipe closely after the fitting is installed. It will be apparent to those skilled in the art that my invention is subject to still other modifications and variations within the scope of the appended claims. Moreover, while reference has been made to use of fittings in accordance with my invention in connection with piping in aircraft, the invention is in no way limited to such use.

What I claim is:

1. In a semi-flexible pipe joint, the combination with a pipe having an external circumferential bead of a larger diameter than the pipe and spaced from the end thereof, of a fitting comprising a body portion having an aperture to receive the end of said pipe and an annular gasket recess adjacent said aperture, an annular gasket received in said recess and fitting over said bead the gasket having an axial length greater than the axial length of the beaded portion of the pipe, an expansible ring at the outer end of said gasket, said ring being sufficiently expansible to pass over said bead, an annular gasket follower, and means for moving said follower toward said body portion to apply sealing pressure to said gasket and to lock said expansible ring against expansion.

2. In a semi-flexible pipe joint, the combination with a pipe having an external circumferential bead of larger diameter than the pipe and spaced from the end of the pipe, of a fitting comprising a body portion having an aperture to receive the end of said pipe but of lesser inside diameter than the outside diameter of said bead and an annular gasket recess adjacent said aperture, an annular gasket received in said recess and fitting over said bead, an expansible ring at the outer end of said gasket, said ring being normally of lesser inside diameter than the outside diameter of said bead but being sufficiently expansible to pass over said bead, an annular gasket follower having an inside diameter greater than the outside diameter of said bead but less than the outside diameter of said expansible ring and cooperating with said body portion to apply sealing pressure to said gasket and to lock said expansible ring against expansion.

3. A semi-flexible pipe fitting for pipe having an external circumferential bead of larger diameter than the normal diameter of the pipe, said fitting comprising a body portion having an annular gasket recess, an annular gasket received in said recess and fitting over the beaded portion of the pipe, an expansible metallic ring at the outer end of said gasket and forming a unitary structure therewith, and an annular gasket follower having an inside diameter greater than the outside diameter of said bead but less than the outside diameter of said expansible ring and cooperating with said body portion to apply sealing pressure to said gasket and to lock said expansible ring against expansion, thereby preventing the separation of the pipe and the fitting under tension.

4. A semi-flexible pipe fitting for pipe having an external circumferential bead of larger diameter than the diameter of the pipe, comprising a body portion having an annular gasket recess, an annular gasket received in said recess and fitting over the beaded portion of the pipe, an expansible ring at the outer end of said gasket, and an annular gasket follower having an inside diameter greater than the outside diameter of said bead but less than the outside diameter of said expansible ring and cooperating with said body portion and said expansible ring to apply sealing pressure to said gasket and to lock said expansible ring against expansion, thereby preventing the separation of the pipe and the fitting under tension.

5. A semi-flexible pipe fitting for pipe having an external circumferential bead of larger diameter than the pipe and spaced from the end of the pipe, comprising a body portion having an aperture to receive the end of said pipe and an annular gasket recess adjacent said aperture, an annular gasket fitting over the beaded portion of the pipe, an expansible metallic ring at each end of said gasket, said rings being disposed on opposite sides of said bead when the fitting is positioned on the pipe, and an annular gasket follower having an inside diameter greater than the outside diameter of said bead and less than the outside diameter of the expansible ring at the outer end of the gasket, said follower cooperating with said body portion and said expansible rings to apply sealing pressure to the gasket and to prevent movement of said pipe bead from between said expansible rings.

6. A semi-flexible pipe fitting for pipe having an external circumferential bead of larger diameter than the pipe, comprising a body portion having an annular gasket recess, an annular gasket received in said recess and fitting over the beaded portion of the pipe, an annular armor helix disposed at the outer end of said gasket and having substantially continuous turns at least partially embedded in the material of said gasket and substantially flush with the pipe engaging face of the gasket, and an annular gasket follower having an inside diameter greater than the outside diameter of said bead but less than the outside diameter of said armor.

7. A semi-flexible pipe fitting for pipe having an external circumferential bead of larger diameter than the pipe, comprising a body portion having an annular gasket recess, an annular gasket fitting over the beaded portion of the pipe and having an annular groove to receive said bead, said groove being disposed nearer the inner than the outer end of the gasket, an annular armor helix disposed at the outer end of said gasket and substantially flush with the pipe engaging face of the gasket, and an annular gasket follower having an inside diameter greater than the outside diameter of said bead but less than the outside diameter of said armor.

8. In a semi-flexible pipe joint, the combination with a pipe having an external circumferential bead of larger diameter than the pipe and spaced from the end thereof, of a fitting comprising a body portion having an aperture to receive the end of the pipe and an annular gasket recess adjacent the aperture, an annular gasket received in the recess and fitting over the bead, an expansible ring at the outer side of the gasket, the ring being sufficiently expansible to pass over the bead, a gasket follower, and means for moving the gasket follower to apply sealing pressure to the gasket and to lock the expansible ring against expansion, the body portion at the end of the pipe having a predetermined diameter larger than the diameter of the wall of the pipe and small enough so that movement of the pipe about the coupling is restricted by contact between the inside of the pipe and the inside of the body portion.

ROGER E. RISLEY.

REFERENCES CITED

The following references are of record in the file of this patent:

UNITED STATES PATENTS

| Number | Name | Date |
| --- | --- | --- |
| 980,671 | Price | Jan. 3, 1911 |
| 1,347,470 | Bard | July 20, 1920 |
| 1,984,806 | Pfefferle | Dec. 18, 1934 |
| 2,021,745 | Pfefferle et al. | Nov. 19, 1935 |
| 2,269,695 | Scharf | Jan. 13, 1942 |
| 2,277,990 | Lanninger | Mar. 31, 1942 |
| 2,344,698 | Howe | Mar. 21, 1944 |
| 2,358,408 | McMurray | Sept. 19, 1944 |